US010407566B2

(12) United States Patent
Lee et al.

(10) Patent No.: US 10,407,566 B2
(45) Date of Patent: Sep. 10, 2019

(54) METHOD FOR PREPARING STYRENE-BUTADIENE RUBBER HAVING LOW COMBINED STYRENE CONTENT

(71) Applicant: LG Chem, Ltd., Seoul (KR)

(72) Inventors: Se Eun Lee, Daejeon (KR); Byoung Yun Kim, Daejeon (KR); In Sung Jo, Daejeon (KR); Jae Min Lee, Daejeon (KR); Woo Seok Choi, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 15/548,579

(22) PCT Filed: Nov. 25, 2016

(86) PCT No.: PCT/KR2016/013731
§ 371 (c)(1),
(2) Date: Aug. 3, 2017

(87) PCT Pub. No.: WO2017/095087
PCT Pub. Date: Jun. 8, 2017

(65) Prior Publication Data

US 2017/0369684 A1 Dec. 28, 2017

(30) Foreign Application Priority Data

Nov. 30, 2015 (KR) ........................ 10-2015-0168278

(51) Int. Cl.

| | |
|---|---|
| ***C08F 2/24*** | (2006.01) |
| ***C08F 236/10*** | (2006.01) |
| ***C08L 9/06*** | (2006.01) |
| ***C08F 212/08*** | (2006.01) |
| ***C08F 2/26*** | (2006.01) |

(52) U.S. Cl.
CPC *C08L 9/06* (2013.01); *C08F 2/24* (2013.01); *C08F 2/26* (2013.01); *C08F 212/08* (2013.01); *C08F 236/10* (2013.01)

(58) Field of Classification Search
CPC ...... C08L 9/08; C08F 2/24; C08F 2/26; C08F 236/10
See application file for complete search history.

(56) References Cited

U.S. PATENT DOCUMENTS

| | | | | |
|---|---|---|---|---|
| 2,876,203 A * | 3/1959 | Miller | C08F 36/04 524/774 |
| 3,301,802 A | 1/1967 | Myers | |
| 4,064,081 A * | 12/1977 | McCoy | C08F 2/26 428/519 |
| 4,239,669 A | 12/1980 | Scott et al. | |
| 4,963,615 A | 10/1990 | Yuto | |
| 5,045,611 A | 9/1991 | McNeil | |
| 5,583,173 A | 12/1996 | Gujarathi et al. | |
| 6,469,104 B1 | 10/2002 | Colvin et al. | |
| 6,512,053 B1 | 1/2003 | Colvin et al. | |
| 2002/0061955 A1* | 5/2002 | Colvin | C08C 1/14 524/493 |
| 2006/0089454 A1 | 4/2006 | Choi et al. | |
| 2011/0190440 A1 | 8/2011 | Ohta et al. | |

FOREIGN PATENT DOCUMENTS

| | | |
|---|---|---|
| CN | 1972967 A | 5/2007 |
| CN | 103524675 A | 1/2014 |
| CN | 105017483 A | 11/2015 |
| EP | 3037446 A1 | 6/2016 |
| JP | H06053830 B2 | 7/1994 |
| JP | H09003142 A | 1/1997 |
| JP | 5436203 B2 | 3/2014 |
| KR | 19820001786 B1 | 10/1982 |
| KR | 20050038453 A | 4/2005 |
| KR | 100597804 B1 | 7/2006 |
| KR | 100846358 B1 | 7/2008 |
| KR | 100888134 B1 | 3/2009 |
| KR | 101273263 B1 | 6/2013 |
| KR | 20140094046 A | 7/2014 |
| KR | 101471702 B1 | 12/2014 |
| KR | 101527624 B1 | 6/2015 |
| KR | 20150067744 A | 6/2015 |

OTHER PUBLICATIONS

Machine-generated English-language translation of KR 101527624 B.*
Search report from International Application No. PCT/KR2016/013731, dated Mar. 7, 2017.
Chinese Search Report for Application No. CN201680012044.3 dated Jun. 26, 2018.
Extended European Search Report including Written Opinion for Application No. EP16870983.0 dated Sep. 28, 2018.

* cited by examiner

*Primary Examiner* — Vu A Nguyen
(74) *Attorney, Agent, or Firm* — Lerner, David, Littenberg, Krumholz & Mentlik, LLP

(57) ABSTRACT

The present invention relates to a method for preparing a low styrene-butadiene rubber having a low combined styrene content and, more particular, to a method for preparing a low styrene-butadiene rubber, wherein the low styrene-butadiene rubber contributes to an excellent polymerization rate and vulcanization rate by using an aliphatic organic acid and a sulfonate based compound as emulsifiers, and is excellent in heat stability after blending, thereby improving the workability and viscosity in in roll processing, such that the low styrene-butadiene rubber is advantageous to produce a molded article with improved rigidity and hardness when mixed with a high styrene-butadiene rubber.

5 Claims, No Drawings

METHOD FOR PREPARING STYRENE-BUTADIENE RUBBER HAVING LOW COMBINED STYRENE CONTENT

CROSS-REFERENCE TO RELATED APPLICATIONS

The present application is a national phase entry under 35 U.S.C. § 371 of International Application No. PCT/KR2016/013731, filed Nov. 25, 2016, which claims priority from Korean Patent Application No. 10-2015-0168278, filed with the Korean Intellectual Property Office on Nov. 30, 2015, the entire contents of which are incorporated herein by reference.

TECHNICAL FIELD

The present disclosure relates to a method for preparing styrene-butadiene rubber having a low content of combined styrene capable of enhancing a mixing property with other rubber.

BACKGROUND ART

Automotive tires change or maintain a driving direction of a vehicle, support vehicle and other weights, and absorb and mitigate shocks from the road, and perform a role of braking and towing.

A tire is formed with complex inner structures, and each structure is, although varying depending on the type, commonly formed with a tread part (tread and undertread), a sidewall part, a shoulder part, a bead part, a carcass part, an inner liner, breakers, a bead wire, a chafer, a bead filler (or apex) and a flipper.

A tire formed with the above-mentioned constitution is manufactured as a complex of rubber, a steel cord and a textile cord, and each part is prepared with different compositions for maximizing the role.

A tire bead filler is a rubber layer performing a role of minimizing bead dispersion and protecting beads by mitigating shocks from the outside, and high hardness and modulus properties are required.

A tire bead filler is generally manufactured by mixing a phenol resin to natural rubber, and using a filler such as carbon black.

As the example, Korean Patent No. 10-0888134 discloses a bead filler rubber composition using carbon black and a phenol resin having a melting point of 60° C. to 70° C., a number average molecular weight of 900 to 950 and a weight average molecular weight of 6,000 to 7,000 with material rubber.

In addition, Korean Patent No. 10-1273263 describes a rubber composition for a tire bead filler enhancing hardness and decreasing a modulus difference with adjacent rubber by including carbon black, cashew-modified phenol resin from which m-cresol is removed, and a methylene donor with material rubber.

However, providing sufficient stiffness to the bead part or a shock mitigating ability are lacked with just the phenol resin, and bead wire deformation, and breakaway occur due to high weight and repeated deformation.

In view of the above, studies have been progressed in a direction of changing tire structures for enhancing hardness and modulus properties relating to the stiffness and the shock mitigation, or providing new bead filler compositions.

As one example, a technology of using styrene-butadiene rubber having a different combined styrene content has been proposed. When the combined styrene content is high, stiffness and hardness are high and stability against heat is high, however, compatibility with other rubber is low, and as a result, properties of a finally obtained bead filler decline. In order to compensate this, styrene-butadiene rubber having a low combined styrene content is mixed thereto. This styrene-butadiene rubber has an advantage of having high compatibility while having low thermal resistance and mechanical properties.

In view of the above, Korean Patent No. 10-0846358 prepares a tire bead filler rubber composition including mixed rubber mixing styrene-butadiene rubber having a combined styrene content of 10% to 15% and styrene-butadiene rubber having a combined styrene content of 20% to 25%, natural rubber, carbon black and aramid fiber in order to increase stiffness of the bead filler. The bead filler rubber composition uses only rubber without using a resin such as a phenol resin, and the disclosure proposes that stiffness is enhanced as well as hardness and modulus properties.

However, although using styrene-butadiene rubber having a different combined styrene content is capable of securing complementary effects in the properties theoretically, it has various problems when used in an actual process.

Styrene-butadiene rubber having a low combined styrene content has a very low polymerization rate when prepared through emulsion polymerization, and has low stability against heat applied in a vulcanization process after mixing causing a problem of declining properties of a finally obtained bead filler.

DISCLOSURE

Technical Problem

In view of the above, the applicant of the present disclosure has conducted diverse studies, and has noticed that a polymerization rate and properties of finally obtained rubber change depending on the type of an emulsifier when preparing styrene-butadiene rubber having a low combined styrene content (hereinafter, referred to as 'low styrene-butadiene rubber'), and has identified that thermal stability as well as polymerization properties is improved and compatibility with other synthetic rubber increases when using a mixture of an aliphatic organic acid and a sulfonate-based compound as the emulsifier improving hardness and stiffness of a finally obtained formed article, and has completed the present disclosure.

Accordingly, the present disclosure is directed to providing a method for preparing low styrene-butadiene rubber having excellent mixing stability when vulcanized while having a high polymerization rate, and having excellent compatibility with other synthetic rubber.

Technical Solution

One embodiment of the present disclosure provides a method for preparing low styrene-butadiene rubber using a mixture of an aliphatic organic acid and a sulfonate-based compound as an emulsifier in preparing the low styrene-butadiene rubber.

The low styrene-butadiene rubber has a combined styrene content of 5% to 10%.

The aliphatic organic acid has a linear or branched alkyl group with 12 to 18 carbon atoms.

The sulfonate-based compound includes one type selected from the group consisting of alkyl aryl sulfonates, alkali metal alkyl sulfates, sulfonated alkyl esters, alkali salts of rosin acid, naphthalenesulfonic acids and combinations thereof.

Advantageous Effects

Preparing low styrene-butadiene rubber through mixed use of a specific emulsifier has an advantage of obtaining a high polymerization rate even when using a small amount of the emulsifier.

The low styrene-butadiene rubber prepared as above can be used in various fields by being mixed with other rubber, particularly, high styrene-butadiene rubber having a high combined styrene content, and when used as above, thermal stability is excellent after mixing in the preparation process, and workability and adhesion are improved when rolling.

Particularly, hardness and stiffness are strengthened when mixing the low styrene-butadiene rubber and the high styrene-butadiene rubber, and a use as a tire bead filler is possible with just synthetic rubber without using a separate resin.

MODE FOR DISCLOSURE

The present disclosure provides a method for preparing low styrene-butadiene rubber facilitating a preparation of formed rubber article having enhanced properties and workability.

The styrene-butadiene rubber is formed with a styrene repeating unit and a butadiene repeating unit as represented by the following Chemical Formula 1:

[Chemical Formula 1]

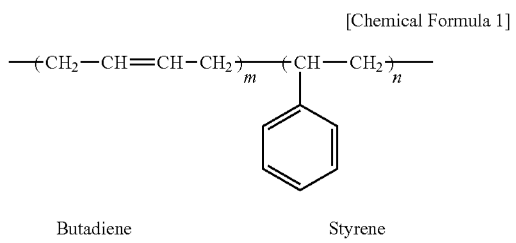

Standard styrene-butadiene rubber has a combined styrene content of 23.5% by weight, and having a higher combined styrene content is referred to as high styrene-butadiene rubber. When a combined styrene content increases, hardness or strength increases, a tensile property declines, and a brittleness property is enhanced.

The term 'low styrene-butadiene rubber' mentioned in the present specification means having a low combined styrene content in the styrene-butadiene rubber, and specifically, means having a combined styrene content of 1% by weight to 15% by weight and preferably 5% by weight to 10% by weight.

In addition, the term 'high styrene-butadiene rubber' mentioned in the present specification means having a high combined styrene content in the styrene-butadiene rubber, and specifically, means having a content of 60% by weight to 95% by weight and preferably 80% by weight to 90% by weight.

In order to be used in a formed article such as a bead filler of a tire, the low styrene-butadiene rubber is generally mixed with the high styrene-butadiene rubber instead of being used alone.

Herein, performance of the bead filler is greatly influenced by a macro structure (molecular weight, molecular weight distribution, polymer side branch chain, crystallinity and the like), a microstructure (monomer arrangement, polystyrene content, vinyl content of polydiene and the like), chemical functionalization and the like of the styrene-butadiene rubber. In other words, depending on the combined styrene content, a glass transition temperature (Tg) increases, tensile strength decreases and abrasion resistance relatively decreases, however, wet road braking power tends to increase.

In addition, stability against heat decreases in a vulcanization process after mixing the low styrene-butadiene rubber and the high styrene-butadiene rubber due to a difference in the macro structure and the microstructure, and as a result, properties of a formed article decline.

In addition, the polymerization type also affects performance. In other words, when preparing using emulsion polymerization, changes occur in the macro structure and the microstructure of the prepared styrene-butadiene rubber depending on the type of an emulsifier used, the content of the emulsifier, the polymerization time, the polymerization temperature and the like. As one example, depending on the type and the content of an emulsifier, particle sizes of styrene-butadiene rubber latex obtained after emulsion polymerization change, and small particles produce coagulation causing decline in the miscibility with other rubber. In addition, using too much emulsifier causes foaming in the processing process, and the emulsifier remains in a manufactured formed article causing contamination.

Accordingly, when preparing low styrene-butadiene rubber using emulsion polymerization in the present disclosure, an emulsion polymerization method is employed, but low temperature emulsion is carried out using a specific emulsifier.

Specifically, a mixture of an aliphatic organic acid and a sulfonate-based compound is used as the emulsifier.

The aliphatic organic acid may be, as one example, an aliphatic organic acid having 12 to 18 carbon atoms, or an aliphatic organic acid having 14 to 18 carbon atoms or 16 to 18 carbon atoms.

As specific examples, one or more types selected from among oleic acid, lauric acid, myristic acid, palmitic acid, stearic acid, naphthalenesulfonic acid and eicosanoic acid may be used.

Such an aliphatic organic acid is used in 0.5 parts by weight to 7 parts by weight and preferably in 1.5 parts by weight to 5 parts by weight with respect to 100 parts by weight of the styrene-butadiene rubber monomer. When the content is less than the above-mentioned range, stability decreases when polymerized, and the content being greater than the above-mentioned range has a problem of increasing foaming.

As the sulfonate-based compound, one type selected from the group consisting of alkyl aryl sulfonates, alkali metal alkyl sulfates, sulfonated alkyl esters, alkali salts of rosin acid, naphthalenesulfonic acids, and combinations thereof may be included, and preferably, sodium 1-(n-alkyl-naphthalene-4-sulfonate (SANS) or sodium dodecyl benzene sulfonate (SDBS) is used, however, the sulfonate-based compound is not limited thereto.

Such a sulfonate-based compound is used in 0.1 parts by weight to 5 parts by weight and preferably in 0.5 parts by weight to 3 parts by weight with respect to 100 parts by weight of the styrene-butadiene rubber monomer. When the content is less than the above-mentioned range, stability decreases when polymerized, and the content being greater than the above-mentioned range has a problem of increasing foaming.

In addition, the aliphatic organic acid and the sulfonate-based compound are used in a weight ratio of 1:1 to 10:1. When the aliphatic organic acid is used in excess, a problem of increasing coagulation in the produced low styrene-butadiene rubber latex occurs, and when the sulfonate-based compound is used in excess, a problem of longer polymerization time occurs, and therefore, the aliphatic organic acid and the sulfonate-based compound are properly used in the above-mentioned range.

The low styrene-butadiene rubber including a monomer and an emulsifier described above may be prepared through known emulsion polymerization methods.

First, a monomer, an emulsifier, a polymerization initiator, a molecular weight regulator and deionized water are introduced to a polymerization reactor.

Styrene and butadiene are used as the monomer. Herein, the styrene is used in 1% by weight to 15% by weight and preferably in 5% by weight to 10% by weight, and the butadiene is used in 85% by weight to 99% by weight and preferably in 90% by weight to 95% by weight, within 100% by weight of a sum of all the monomers. When the content is outside the above-mentioned range, low styrene-butadiene rubber having a target level of properties is difficult to prepare.

Herein, as the method of introducing the styrene monomer and the butadiene monomer, any method among methods of introducing the monomer mixture to a polymerization reactor at once, introducing the monomer mixture to a polymerization reactor continuously, introducing some of the monomer mixture to a polymerization reactor, and introducing the remaining monomer to a polymerization reactor continuously may be used.

The emulsifier is as described above.

The polymerization initiator is not particularly limited, and a radical initiator may be used. As the radical initiator, one or more types selected from the group consisting of inorganic peroxides such as sodium persulfate, potassium persulfate, ammonium persulfate, potassium superphosphate and hydrogen peroxide; organic peroxides such as t-butyl peroxide, cumene hydroperoxide, p-menthane hydroperoxide, di-t-butyl peroxide, t-butylcumyl peroxide, acetyl peroxide, isobutyl peroxide, octanoyl peroxide, dibenzoyl peroxide, 3,5,5-trimethylhexanol peroxide and t-butyl peroxyisobutyrate; azobisisobutyronitrile, azobis-2, 4-dimethylvaleronitrile, azobiscyclohexanecarbonitrile and methyl azobisisobutyrate may be included, and among such radical initiators, inorganic peroxides are more preferred, and among these, persulfates may be preferably used.

As the amount of the polymerization initiator used, the polymerization initiator is included in 0.01 parts by weight to 2 parts by weight and preferably in 0.02 parts by weight to 1.5 parts by weight with respect to 100 parts by weight of all the monomers forming the low styrene-butadiene rubber. When the content is less than the above-mentioned range, the polymerization rate decreases making it difficult to manufacture a final product, and when the content is greater than the above-mentioned range, the polymerization rate becomes too high and the polymerization may not be controlled.

Herein, in addition the above-mentioned compositions, supplementary materials such as a molecular weight regulator, an activating agent, a chelating agent, a dispersant, a pH regulator, a deoxidizer, a particle size modifier, an antiaging agent and an oxygen scavenger may be added as necessary.

Next, low styrene-butadiene rubber latex is prepared by carrying out emulsion polymerization.

In the emulsion polymerization, the polymerization is carried out at a low temperature of 5° C. to 20° C. and preferably 5° C. to 15° C., and the polymerization is carried out so that the time reaching a conversion ratio of 80% is 7 hours to 8 hours. Such a time range is a time reduced by 1 hour to 2 hours compared to times commonly required, and an overall reaction process time may be reduced.

The polymerization is normally completed at a polymerization conversion ratio of 80%, and latex-type low styrene-butadiene rubber is obtained.

Next, the low styrene-butadiene rubber latex goes through common post treatment procedures such as coagulation and washing to obtain low styrene-butadiene rubber.

The coagulation is carried out through a coagulant addition, and herein, metal halides such as barium chloride, calcium chloride, magnesium chloride, zinc chloride and aluminum chloride; nitrates such as barium nitrate, calcium nitrate and zinc nitrate; acetates such as barium acetate, calcium acetate and zinc acetate; sulfates such as calcium sulfate, magnesium sulfate and aluminum sulfate, and the like may be included as the coagulant. Among these, calcium chloride and magnesium sulfate are preferred. The coagulation is carried out at 50° C. to 100° C., and when coagulated, the coagulant of 5% by weight or less may remain based on the total amount of the total salts used in the coagulation.

The washing may be carried out at 50° C. to 90° C. through the use of distilled water and the like.

In the low styrene-butadiene rubber obtained using the method described above, it is seen that coagulation is less produced even with a short polymerization time of approximately 7 hours (refer to Table 1).

Such low styrene-butadiene rubber may be applied into various products by being used either alone or as a mixture with high styrene-butadiene rubber. In this case, by using the low styrene-butadiene rubber, thermal stability is excellent after mixing, and workability and adhesion are improved when rolling, and as a result, properties, particularly hardness and stiffness, of a final formed article are improved.

Preferably, the low styrene butadiene rubber and the high styrene butadiene rubber are mixed in a weight ratio of 1:9 to 9:1 and preferably 1:8 to 4:6.

Forming after the mixing is not particularly limited in the present disclosure, and methods known in the art are used. As one example, a vulcanizing agent, a vulcanization accelerator and various additives are added to the low styrene-butadiene rubber and the high styrene-butadiene rubber, the mixture is mixed, and then formed into a certain shape through a forming process under a vulcanization reaction.

Sulfur is used as the vulcanizing agent, and peroxide-based compounds may be used as well, however, a sulfur crosslinking system is widely used generally.

The vulcanization accelerator performs a role of enabling the vulcanization reaction to uniformly occur in the rubber reaction site and thereby enhancing vulcanization efficiency and a reaction rate. The vulcanization accelerator may be one or more types selected from the group consisting of thiazole-based, thiuram-based, thiourea-based, guanine-based and thiocarbamate-based activating agents. Specific examples of the thiazole-based include N-t-butyl-2-benzothiazole sulfenamide (TBBS).

Herein, as the additives, a filler, a thermal stabilizer (antiaging agent, antioxidant, rubber stabilizer), an ozone blocking agent, a processing material, an extender oil, a plasticizer, a foam inhibitor, a softener, a flame retardant, an antistatic agent, a retarder, a releasing agent and the like may be used.

In addition, known natural rubber and synthetic rubber may be further included in addition to the additives. As the synthetic rubber capable of being used herein, one type selected from among butadiene rubber, butyl rubber, halogenated butyl rubber, isoprene-containing styrene butadiene rubber, nitrile-including styrene butadiene rubber and neoprene rubber may be used.

A formed rubber article manufactured using such compositions and methods may be used in various industrial goods, various manufacturing industrial goods and the like including tires and adhesives. When used in tires as one example, the formed rubber article is used in bead fillers, treads, belts and the like of the tires, and the tires herein may be tires for automobiles, tires for buses, tires for trucks, tires for aircrafts, tires for motorcycles and the like.

Hereinafter, preferred examples are provided in order to illuminate the present disclosure, however, the following examples are for illustrative purposes only, and it will be obvious to those skilled in the art that various changes and modifications may be made within the category and the technological idea scope of the present disclosure, and such changes and modifications also belonging to the attached claim is obvious as well.

EXAMPLE

Example 1: Preparation of Low Styrene-Butadiene-Based Rubber

Low styrene-butadiene rubber latex was prepared through emulsion polymerization at 10° C. by adding 3.5 parts by weight of an aliphatic organic acid (fatty acid (company name: LG Household and Health Care Ltd., product name: elofad TP 200), 0.5 parts by weight of sodium 1-(n-alkyl-naphthalene-4-sulfonate (SANS), 0.05 parts by weight of an initiator, 0.5 parts by weight of a molecular weight regulator and 200 parts by weight of water with respect to 100 parts by weight of a monomer formed with 94 parts by weight of 1,4-butadiene and 6 parts by weight of styrene in a reaction container. As for the termination of the reaction, the reaction was terminated when a conversion ratio reached 80%.

To 100 parts by weight (solid) of the obtained low styrene-butadiene rubber latex, 2 parts by weight of calcium chloride was added, the temperature was raised to 70° C., and the result was aged for 20 minutes and then cooled to obtain coagulation. After washing the result 2 to 3 times with ion exchange water to remove the residual monomer, the result was dehydrated using a filter. Subsequently, the result was dried using a roll dryer to prepare low styrene-butadiene rubber.

Example 2: Preparation of Low Styrene-Butadiene-Based Rubber

Low styrene-butadiene rubber was prepared in the same manner as in Example 1 except that the content of the aliphatic organic acid and the content of the SANS used were 1.5 parts by weight and 1.0 parts by weight, respectively.

Example 3: Preparation of Low Styrene-Butadiene-Based Rubber

Low styrene-butadiene rubber was prepared in the same manner as in Example 1 except that the content of the aliphatic organic acid and the content of the SANS used were each 2.0 parts by weight.

Comparative Example 1: Preparation of Low Styrene-Butadiene-Based Rubber

Low styrene-butadiene rubber was prepared in the same manner as in Example 1 except that 4.0 parts by weight of the aliphatic organic acid was used alone.

Comparative Example 2: Preparation of Low Styrene-Butadiene-Based Rubber

Low styrene-butadiene rubber was prepared in the same manner as in Example 1 except that 4.0 parts by weight of the SANS was used alone.

Comparative Example 3: Preparation of Low Styrene-Butadiene-Based Rubber

Low styrene-butadiene rubber was prepared in the same manner as in Example 1 except that 4.0 parts by weight of rosin acid was used alone.

Comparative Example 4: Preparation of Low Styrene-Butadiene-Based Rubber

Low styrene-butadiene rubber was prepared in the same manner as in Example 1 except that the aliphatic organic acid and rosin acid were used each in 2.0 parts by weight.

Comparative Example 5: Preparation of Low Styrene-Butadiene-Based Rubber

Low styrene-butadiene rubber was prepared in the same manner as in Example 1 except that the SANS and rosin acid were used each in 2.0 parts by weight.

Test Example 1: Measurement on Properties of Low Styrene-Butadiene-Based Rubber Properties of the low styrene-butadiene rubber obtained in the examples and the comparative examples were evaluated as follows, and the results are shown in the following Table 1.

Polymerization time: polymerization time represents time taken to reach a conversion ratio of 55% through emulsion polymerization, and as for the conversion ratio, monomer to polymer conversion may be identified through measuring a total solid content.

Produced coagulation (%): produced coagulation was measured by weight of produced coagulation in reactor/weight of total monomers introduced*100.

TABLE 1

| | Category | | | | |
|---|---|---|---|---|---|
| | Emulsifier Content (Parts by Weight) | | | Properties | |
| | Aliphatic Organic Acid | SANS | Rosin Acid | Polymer-ization Time (hr) | Produced Coagulation (% by Weight) |
| Example 1 | 3.5 | 0.5 | — | 7.1 | 0.02 |
| Example 2 | 1.5 | 1.0 | — | 7.9 | 0.01 |
| Example 3 | 2.0 | 2.0 | — | 7.5 | 0.005 |
| Comparative Example 1 | 4.0 | — | — | 7.5 | 0.3 |
| Comparative Example 2 | — | 4.0 | — | 14 | 0.005 |
| Comparative Example 3 | — | — | 4.0 | 9.0 | 0.5 |
| Comparative Example 4 | 2.0 | — | 2.0 | 8.2 | 0.4 |
| Comparative Example 5 | — | 2.0 | 2.0 | 10 | 0.05 |

When referring to Table 1, the polymerization was completed in approximately 7 hours of polymerization time when mixing an aliphatic organic acid and a sulfate-based compound according to the present disclosure, and it was seen that a polymerization reaction rate decreased compared to Comparative Examples 1 to 5.

In addition, in the content of the produced coagulation, the content was very small of 0.005% by weight in Example 3, and it was seen that the produced low styrene-butadiene rubber had excellent stability.

Test Example 2: Formed Rubber Article and Property Measurement (1) Preparation of Rubber Mixture Each of the styrene butadiene rubber coagulation prepared in the examples and the comparative examples and high styrene-butadiene rubber (combined styrene content 85%, particle size 100 nm to 200 nm) were mixed in a weight ratio or 2:8 according to the ASTM D3187 using a Banbury mixer. For the obtained mixture, properties were measured as follows.

(2) Property Measurement

The following properties were evaluated using the specimens obtained in (1), and the results are shown in the following Table 2.

<Mixture Properties>

Mooney viscosity (MV): Mooney viscosity was measured based on the DIN 53523/3.

Condition of mixing thermal stability evaluation

Milling was carried out to a thickness of 0.2 mm in a 160° C. roller (amount of specimen 200 g) and aged specimens were collected at an interval of 1.5, 5, 10, 15, 20, 25, 30, 40, 50 and 60 minutes to evaluate color stability when mixed. The evaluation was performed using a 5-point scale, and the grade being lower in the 0 to 5 points means a decrease in the mixing thermal stability.

<Vulcanization Property (MDR: Moving Die Rheometer)>:

vulcanization profiles and relating analysis data thereof were measured in a Monsanto MDR2000 Rheometer in accordance with the ASTM D5289-95.

T5: time taken to reach 5% vulcanization was measured (160° C., 3 minutes).

Vmax (vulcanization rate): Vmax means maximum torque required for 100% vulcanization.

<Mechanical Properties>

Tensile strength (TS, kgf/cm$^2$): tensile strength of the vulcanizate obtained after vulcanizing the mixture for 45 minutes at 145° C. was measured.

Elongation (%): elongation of the vulcanizate obtained after vulcanizing the mixture for 45 minutes at 145° C. was measured.

100% modulus: modulus at 100% elongation of the vulcanizate obtained after vulcanizing the mixture for 45 minutes at 145° C. was measured.

Hardness: in order to measure hardness of the prepared vulcanizate, Durometer hardness (JIS A, Shore type) was used in accordance with the ASTM D2240. The vulcanized specimen was prepared to have a thickness of minimum 6 mm, and after placing a needle perpendicular to a measuring surface of the specimen, hardness was measured 3 times at the specimen center with a load of approximately 2 kg (19.6 N), and an average value was calculated.

TABLE 2

| | | Example 1 | Example 2 | Example 3 | Comparative Example 1 | Comparative Example 2 | Comparative Example 3 | Comparative Example 4 | Comparative Example 5 |
|---|---|---|---|---|---|---|---|---|---|
| Properties of Rubber Mixture | MV | 40 | 44 | 423 | 45 | 40 | 43 | 46 | 41 |
| | Mixing Thermal Stability (5 Point Scale) | 5 | 5 | 5 | 2.5 | 4.5 | 3 | 3.5 | 4.0 |
| MDR (160° C., 30 min) | T5 (min) | 1.14 | 1.13 | 1.17 | 1.08 | 1.50 | 1.70 | 1.17 | 1.6 |
| | Vmax (N · M) | 23.7 | 25.1 | 24.3 | 23.0 | 19.1 | 20.5 | 24.1 | 21.0 |
| Mechanical Property | Tensile Strength (kg/cm$^2$) | 192 | 189 | 181 | 185 | 156 | 167 | 189 | 179 |
| | Elongation (%) | 346 | 374 | 295 | 344 | 275 | 277 | 374 | 362 |
| | 100% Modulus | 57 | 58 | 56 | 51 | 52 | 55 | 51 | 45 |
| | Hardness | 81 | 80 | 80 | 78 | 77 | 77 | 78 | 77 |

Based on the results of Table 1, it was seen that the rubber of Example 1 prepared using the emulsifier content ratio according to the present disclosure had relatively low Mooney viscosity and had excellent thermal stability after mixing.

Such a result becomes obvious when comparing this result with the results of Comparative Examples 1 to 5 using other emulsifiers.

Particularly, in the results of mechanical properties, the rubber of Examples 1 to 3 had excellent tensile strength, elongation and modulus properties compared to the rubber of Comparative Examples 1 to 5, and particularly, hardness was enhanced by 2 to 3 or higher.

Accordingly, it was seen that, when using both an aliphatic organic acid and SANS as an emulsifier as in the present disclosure, mixing stability with high styrene-butadiene copolymer is enhanced and properties of a finally obtained formed rubber article are enhanced.

INDUSTRIAL APPLICABILITY

In the above descriptions, the tire represents any one selected from among tires for automobiles, tires for buses, tires for trucks, tires for aircrafts and tires for motorcycles.

The invention claimed is:

1. A method for preparing styrene-butadiene rubber, comprising a step of polymerizing styrene monomer and butadiene monomer using an emulsifier, wherein the emulsifier is a mixture of an aliphatic organic acid and a sulfonate-based compound, the sulfonate-based compound includes one type selected from the group consisting of alkyl aryl sulfonates, alkali metal alkyl sulfonate, sulfonated alkyl esters and combinations thereof, the sulfonate-based compound is used in 1 part by weight to 5 parts by weight with respect to 100 parts by combined weight of the styrene monomer and the butadiene monomer, and the aliphatic organic acid and the sulfonate-based compound are used in a weight ratio of 1:1 to 10:1.

2. The method for preparing styrene-butadiene rubber of claim 1, wherein styrene content in the styrene-butadiene rubber is of 5% by weight to 10% by weight.

3. The method for preparing styrene-butadiene rubber of claim 1, wherein the aliphatic organic acid has a linear or branched alkyl group with 12 to 18 carbon atoms.

4. The method for preparing styrene-butadiene rubber of claim 1, wherein the aliphatic organic acid includes one type selected from the group consisting of oleic acid, lauric acid, myristic acid, palmitic acid, stearic acid, eicosanoic acid and combinations thereof.

5. The method for preparing styrene-butadiene rubber of claim 1, wherein the aliphatic organic acid is used in 0.5 parts by weight to 7 parts by weight with respect to 100 parts by the combined weight of the styrene monomer and the butadiene monomer.

* * * * *